United States Patent [19]
Wells

[11] Patent Number: 6,126,905
[45] Date of Patent: Oct. 3, 2000

[54] BAFFLES FOR A FLUID TO FLUID CONTACTOR

[75] Inventor: Jan W. Wells, Bartlesville, Okla.

[73] Assignee: Phillips Petroleum Company, Bartlesville, Okla.

[21] Appl. No.: 09/031,787

[22] Filed: Feb. 27, 1998

[51] Int. Cl.[7] ............................. B01J 8/18; C10G 35/14
[52] U.S. Cl. .................... 422/144; 422/143; 422/205; 422/228; 208/113; 208/161
[58] Field of Search .................. 422/143–145, 422/147, 205, 228, 191; 208/113, 153, 155, 161, 164

[56] References Cited

U.S. PATENT DOCUMENTS

| | | | |
|---|---|---|---|
| 4,364,905 | 12/1982 | Fahrig et al. | 422/144 |
| 4,500,423 | 2/1985 | Krug et al. | 208/161 |
| 5,015,363 | 5/1991 | Cetinkaya | 208/150 |
| 5,141,625 | 8/1992 | Lomas | 208/113 |
| 5,273,720 | 12/1993 | Zinke | 422/144 |
| 5,316,662 | 5/1994 | Cetinkaya | 208/113 |
| 5,449,498 | 9/1995 | Cetinkaya | 422/144 |
| 5,565,177 | 10/1996 | Cetinkaya | 422/144 |
| 5,601,787 | 2/1997 | Owen et al. | 422/144 |
| 5,662,868 | 9/1997 | Letzsch et al. | 422/144 |

*Primary Examiner*—Hien Tran
*Attorney, Agent, or Firm*—Jeffrey R. Anderson

[57] ABSTRACT

A novel apparatus and process, including a baffle, for contacting a first fluid with a second fluid of lower density than the first fluid in counter-current flow in a manner that increases the contacting efficiency.

31 Claims, 7 Drawing Sheets

BAFFLES FOR A FLUID TO FLUID CONTACTOR

The present invention relates to processes for contacting counter-currently flowing fluids. In another aspect, the invention relates to a method and apparatus for contacting stripping gas with counter-currently flowing spent catalyst for stripping hydrocarbons from the spent catalyst of a fluidized bed catalytic cracking unit operation.

BACKGROUND OF THE INVENTION

The process of contacting one fluid with another fluid in counter-current flow in a contacting unit for such purposes as absorption, reaction, and stripping is well known in the art. Fluid, as used herein, is defined as any mass of solid particles, liquid or gaseous material capable of fluidic motion. Generally, such fluid to fluid contacting units are designed with an inlet at one end of a vessel to receive a first fluid to be contacted with another fluid and an inlet at the other end of the vessel to receive the other fluid. The desire in such a unit is to maximize the contacting efficiency between the two fluids. However, problems with channeling of one of the contacting fluids in the vessel and other causes of insufficient mixing often reduce contacting efficiency.

A specific example of this is in the contacting of finely divided spent catalyst from a fluidized bed in a fluidized bed catalytic cracking unit (commonly referred to as FCCU) with stripping gas for the removal of hydrocarbon reaction products from the spent catalyst. The finely divided spent catalyst is directed downwardly in the stripping zone and the stripping gas, typically steam, is directed upwardly in the stripping zone. Many efforts have been made to improve the spent catalyst/steam contacting efficiency. See, for example, U.S. Pat. No. 5,015,363 (Cetinkaya); U.S. Pat. No. 5,141,625 (Lomas); U.S. Pat. No. 4,364,905 (Fahrig et al.); U.S. Pat. No. 4,500,423 (Krug et al.); U.S. Pat. No. 5,316,662 (Cetinkaya). These efforts are indicative of the great need in the industry for improved fluid to fluid contacting. Thus, it is desirable to have a method and apparatus for contacting one fluid with another fluid, and more particularly, spent FCCU catalyst with stripping gas, in a more efficient manner.

SUMMARY OF THE INVENTION

It is, therefore, an object of this invention to provide an apparatus to be used in the contacting of one fluid with another fluid in a more efficient manner.

A further object of this invention is to provide a method of contacting one fluid with another fluid in a manner that increases the contacting efficiency.

A yet further object of this invention is to improve the efficiency of FCCU operations.

A more specific object of this invention is to provide an improved method and apparatus for stripping hydrocarbons from the surface and interstitial spaces of spent FCCU catalyst.

In accordance with the present invention, the fluid to fluid contactor includes a generally cylindrical vessel having an inside wall defining a contacting zone within the generally cylindrical vessel which includes an upper portion, a lower portion, and an intermediate portion. The generally cylindrical vessel further includes a tubular support member vertically disposed within the center of the intermediate portion of the generally cylindrical vessel, and a plurality of generally rectangular segmenting plates dividing the intermediate portion into a plurality of vertically elongated segments. These generally rectangular segmenting plates are secured to the tubular support member at an inner edge and the other vertical edge is secured to the inside wall of the generally cylindrical vessel. The plurality of generally rectangular segmenting plates, the tubular support member, and the inside wall define the plurality of vertically elongated segments within the intermediate portion of the generally cylindrical vessel. The generally cylindrical vessel also has a first introduction means for introducing a first fluid, to be contacted with a second fluid, into the upper portion of the generally cylindrical vessel, a second introduction means for introducing a second fluid, of lower density than the first fluid, into the lower portion of the generally cylindrical vessel, a first withdrawing means for withdrawing the first fluid, after contact with the second fluid, from the lower portion of the generally cylindrical vessel, and a second withdrawing means for withdrawing the second fluid, after contact with the first fluid, from the upper portion of the generally cylindrical vessel. In accordance with a specific aspect of the invention, each vertically elongated segment contains at least one baffle.

Each of the baffles includes a generally triangular plate having a first edge that is arc shaped to match the radius of the tubular support member, and having a second edge, a third edge and a fourth edge. The first edge of the generally triangular plate is secured to the tubular support member and extends upwardly and outwardly from the tubular support member at an angle from a horizontal plane in the range of from about 10 degrees to about 60 degrees and terminates at the fourth edge of the generally triangular plate which is positioned between the tubular support member and the inside wall. Each of the baffles further include a generally rectangular skirt plate having a pair of vertical edges, a top edge and a bottom edge. The top edge of each of the skirt plates is secured to the fourth edge of the generally triangular plate and extends downwardly from the fourth edge of the generally triangular plate.

In one embodiment of the invention, the baffles form a seal within the vertically elongated segments. In another embodiment of the invention, each of the skirt plates of the baffles further include multiple perforations and still further have saw teeth along the bottom edge. In yet another embodiment, each of the baffles further include fluid deflector plates for preventing fluid build-up on the surface of the upwardly slanted generally triangular plates of the baffles.

The invention further includes the method of operating the fluid to fluid contactor described above. In one preferred mode for operation of the fluid to fluid contactor, spent catalyst, having an accumulation of hydrocarbons, enters the upper portion of the generally cylindrical vessel through the first introduction means and stripping gas is introduced to the lower portion of the generally cylindrical vessel through the second introduction means. Stripped catalyst, having reduced accumulation of hydrocarbons than the accumulation of hydrocarbons on the spent catalyst, is withdrawn from the lower portion of the generally cylindrical vessel through the first withdrawing means. The stripping gas, containing stripped hydrocarbons, is withdrawn from the upper portion of the generally cylindrical vessel through the second withdrawing means.

Other objects and advantages of the invention will be apparent from the detailed description of the invention and the appended claims.

DETAILED DESCRIPTION OF THE INVENTION

The apparatus and process of the present invention will be described with reference to the drawings. Reference to the specific configurations of the drawings is not meant to limit the invention to the details of the drawings disclosed in conjunction therewith.

Figure 1:
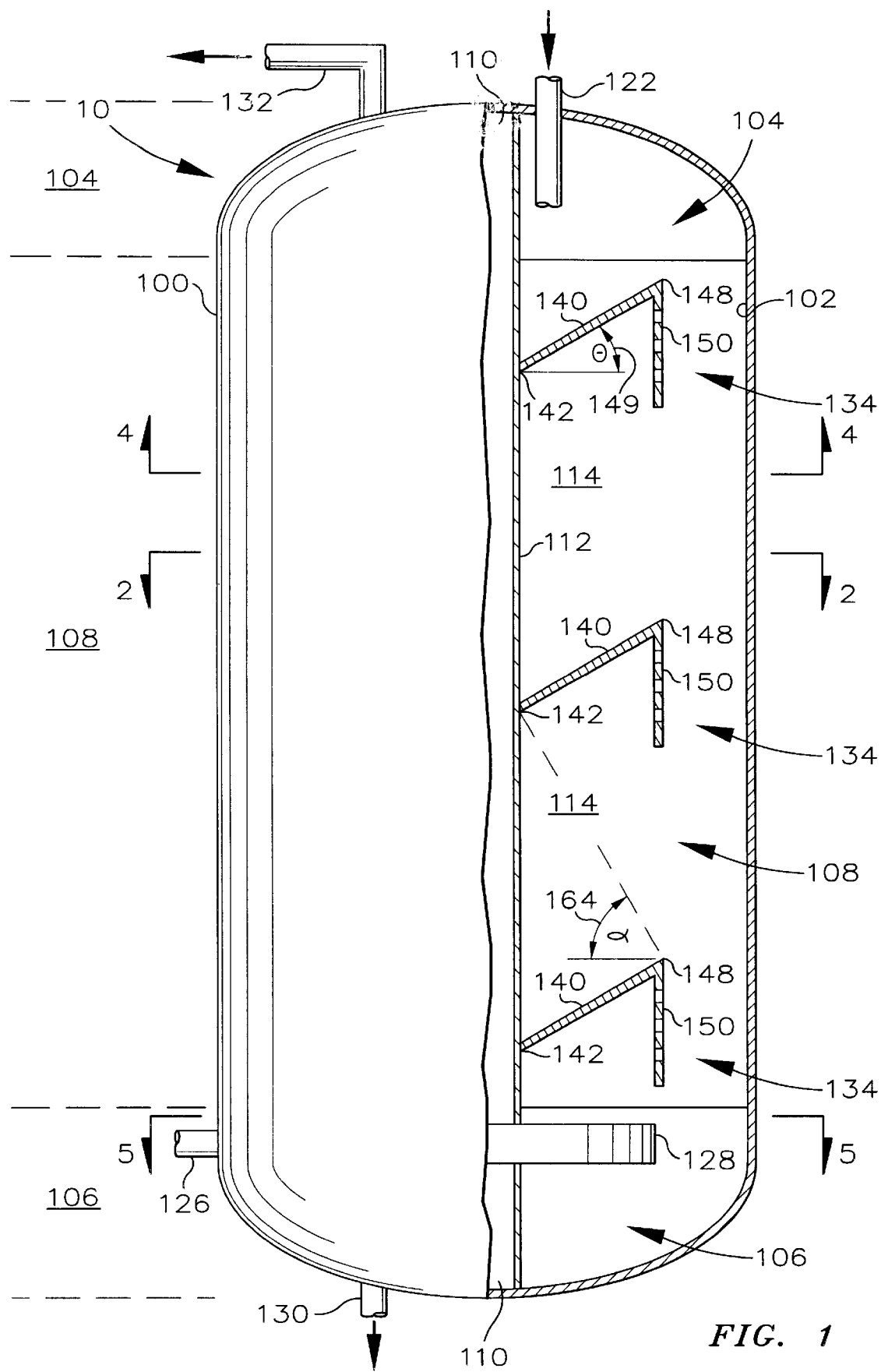
FIG. 1 is a partially cut-away elevation of a segmented fluid to fluid contactor that incorporates the baffling system of the invention.

Referring to FIGS. 1–7, and in particular FIG. 1, therein is illustrated the inventive fluid to fluid contactor 10 including an upright, generally cylindrical vessel 100 having an inside wall 102 which defines a contacting zone including an upper portion 104, a lower portion 106, and an intermediate portion 108 between the upper portion 104 and lower portion 106. The generally cylindrical vessel 100 further includes a tubular support member 110, having an outer surface 112, vertically disposed at the center of the generally cylindrical vessel 100, and a plurality of generally rectangular segmenting plates 114 (better illustrated in FIGS. 2, 3 and 4) within the intermediate portion 108 which are fixedly secured to the inside wall 102 of the generally cylindrical vessel 100 and to the outer surface 112 of the tubular support member 110. The generally cylindrical vessel 100, tubular support member 110 and generally rectangular segmenting plates 114 can comprise any suitable erosion resistant material including, but not limited to, ceramic or metal.

Figure 2:
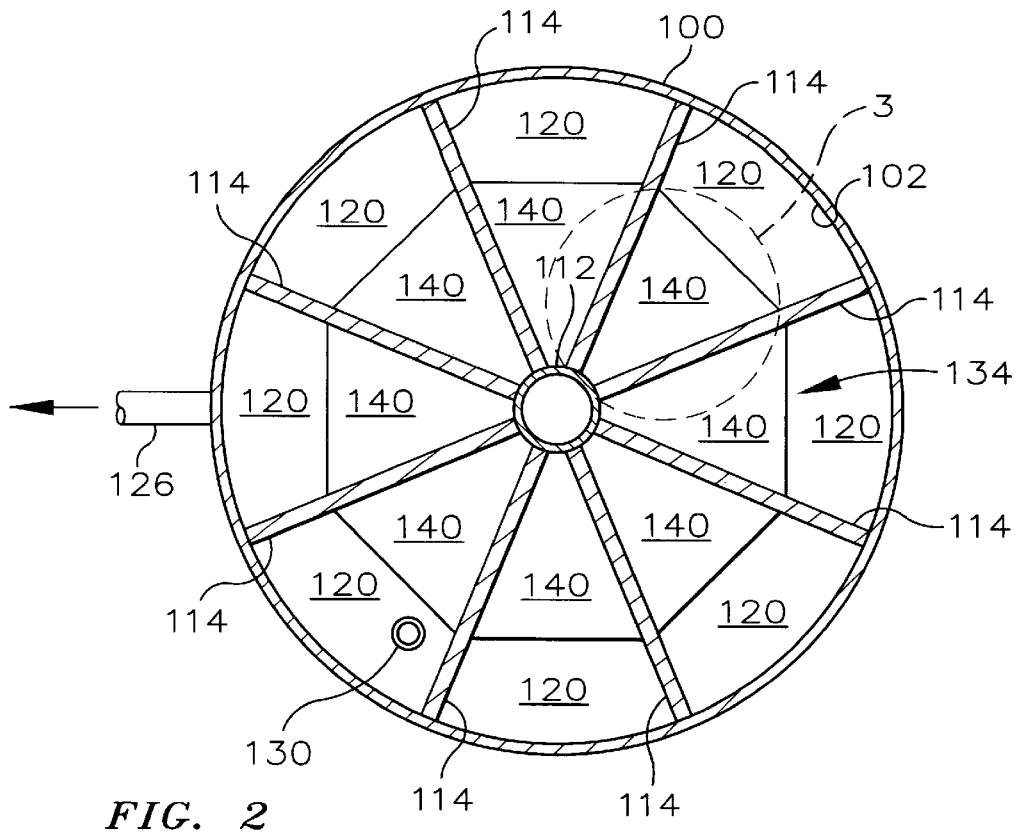
FIG. 2 is a section taken across line 2—2 of the fluid to fluid contactor of FIG. 1.
Figure 4:
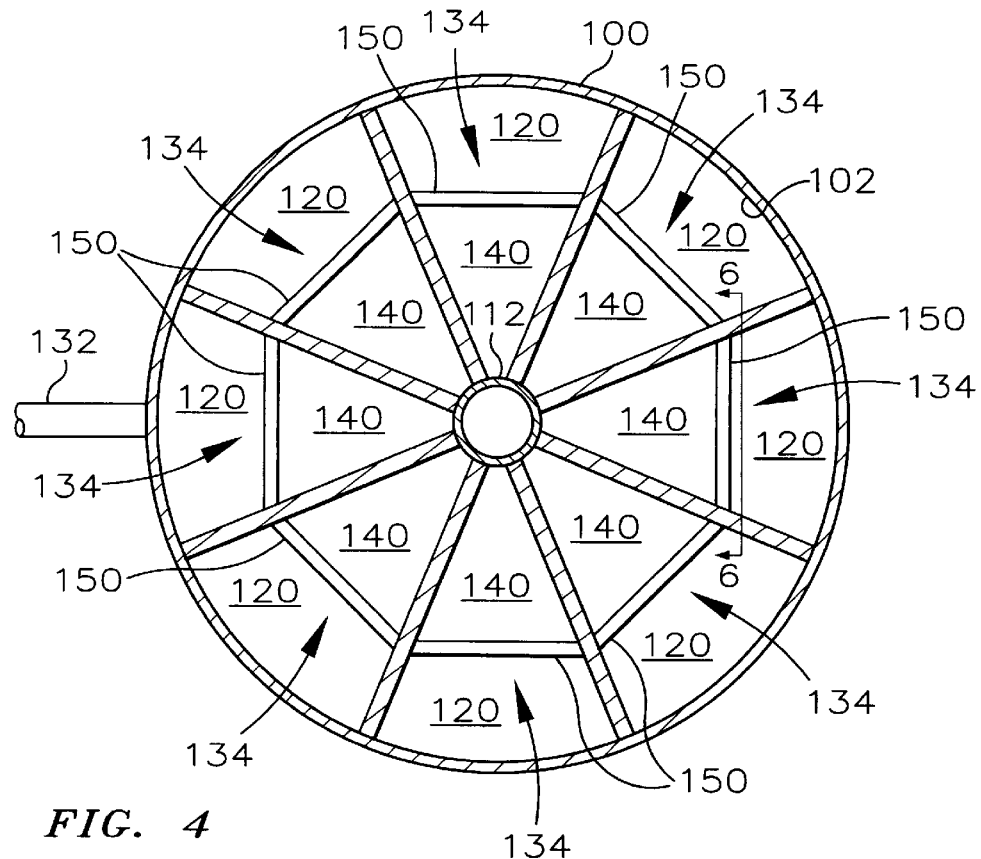
FIG. 4 is a section taken across line 4—4 of the fluid to fluid contactor of FIG. 1.
Figure 5:
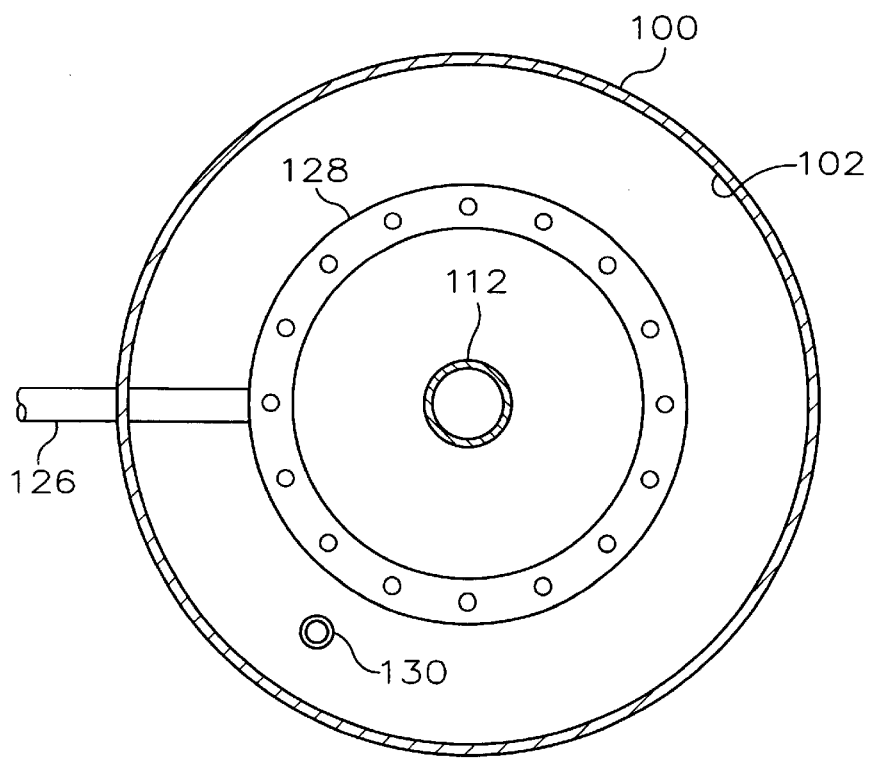
FIG. 5 is a section taken across line 5—5 of the fluid to fluid contactor of FIG. 1.

The plurality of generally rectangular segmenting plates 114, the outer surface 112 and the inside wall 102 define a plurality of vertically elongated segments 120 within intermediate portion 108 (as shown in FIGS. 2 and 4). The number of vertically elongated segments 120 depicted in FIGS. 2 and 4 is not intended as a limitation of the invention. More or fewer vertically elongated segments 120 can be used to practice the invention. The number of vertically elongated segments 120 ranges from 2 to 12; preferably from 4 to 10; and most preferably from 6 to 8. The contacting and mixing effectiveness increases with the number of vertically elongated segments used. However, the number of vertically elongated segments practically useful is limited by economics and the physical constraints of the generally cylindrical vessel 100.

The generally cylindrical vessel 100 further comprises a first introduction means 122, a second introduction means 126, a fluid distributor 128 (shown in FIG. 1 and FIG. 5), a first withdrawing means 130, and a second withdrawing means 132.

Each of the vertically elongated segments 120 contain at least one baffle 134. The baffle 134, which is best illustrated in FIGS. 2, 4, 6, 7 and 8, comprises a generally triangular plate 140, having a first edge 142 are shaped to match the radius of the tubular support member 112, a second edge 144, a third edge 146, and a fourth edge 148. The first edge 142 is fixedly secured to outer surface 112 and the generally triangular plate 140 extends upwardly and outwardly from the outer surface 112 at an angle 149 (also shown as θ) from a horizontal plane in the range of from about 10 to about 60 degrees; preferably in the range of from about 20 to about 45 degrees; and most preferably in the range of from 25 to 35 degrees. Generally triangular plate 140 terminates at fourth edge 148.

In a preferred embodiment the generally triangular plate 140 is a truncated triangle having four sides, and wherein the first edge 142 is formed by replacing an apex of a triangle with a curved section.

The ratio of the distance, on a horizontal plane, between the fourth edge 148 and the outer surface 112 to the distance, also on a horizontal plane, between the inside wall 102 and the outer surface 112 is between about 0.25 and 0.75; preferably between about 0.25 and 0.50; and most preferably about 0.50. The fluid to fluid contacting efficiency is diminished when the ratio falls below about 0.25, whereas the flow of the downflowing first fluid (particularly a fluidized solid first fluid) is constricted when the ratio is greater than about 0.75. Each baffle 134 further comprises a generally rectangular skirt plate 150 which is fixedly secured to the fourth edge 148 of generally triangular plate 140. The skirt plate 150 extends downwardly from the fourth edge 148.

The vertical spacing of the baffles 134, where the downflowing fluid is a fluidized solid, is such that the angle 164 (also shown as α), from a horizontal plane, formed by the fourth edge 148 of the lower baffle 134 and the first edge 142 of the upper baffle 134 is about equal to the angle of internal friction of the fluidized solid. The angle of internal friction is the angle at which a solid will flow on itself in a nonfluidized state. If the angle 164 is greater than the angle of internal friction, the fluid horizontally jetting from the baffles 134 appears to adhere to the inside wall 102 of the generally cylindrical vessel 100 and some turbulent mixing is lost. If the angle 164 is less than the angle of internal friction, the flow of the downflowing fluidized solid fluid is restricted. For non-solid fluids, the spacing of the baffles 134 must be such as to ensure turbulent mixing of the two fluids. For catalytic cracking catalyst, the angle of internal friction is between about 75 and 85 degrees; preferably between about 77 and 82 degrees; and most preferably between about 78 and 80 degrees. The baffles 134 can be constructed of any reasonable erosion resistant material including, but not limited to, metal, refractory and ceramics.

Figure 3:
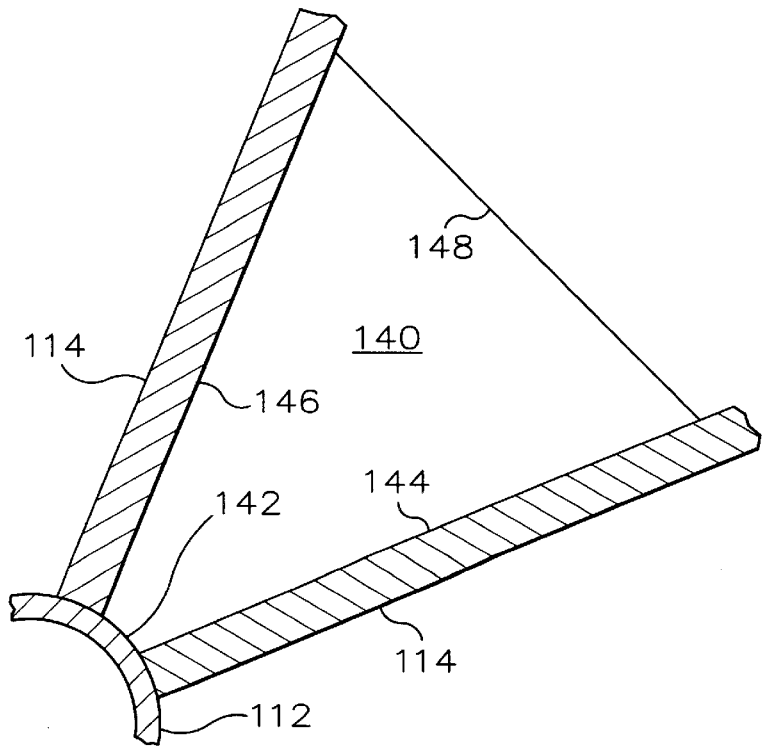
FIG. 3 is an enlarged plan view of a typical generally triangular plate of the baffle of the invention as shown in the section of FIG. 2.

In FIG. 3, a partial view providing further detail of generally triangular plate 140 is presented. Therein is shown first edge 142, second edge 144, third edge 146 and fourth edge 148. Also shown, and representing another embodiment, the second edge 144 and the third edge 146 are fixedly secured to generally rectangular segmenting plates 114 such that an airtight seal is formed within a portion of vertically elongated segments 120.

Figure 6:
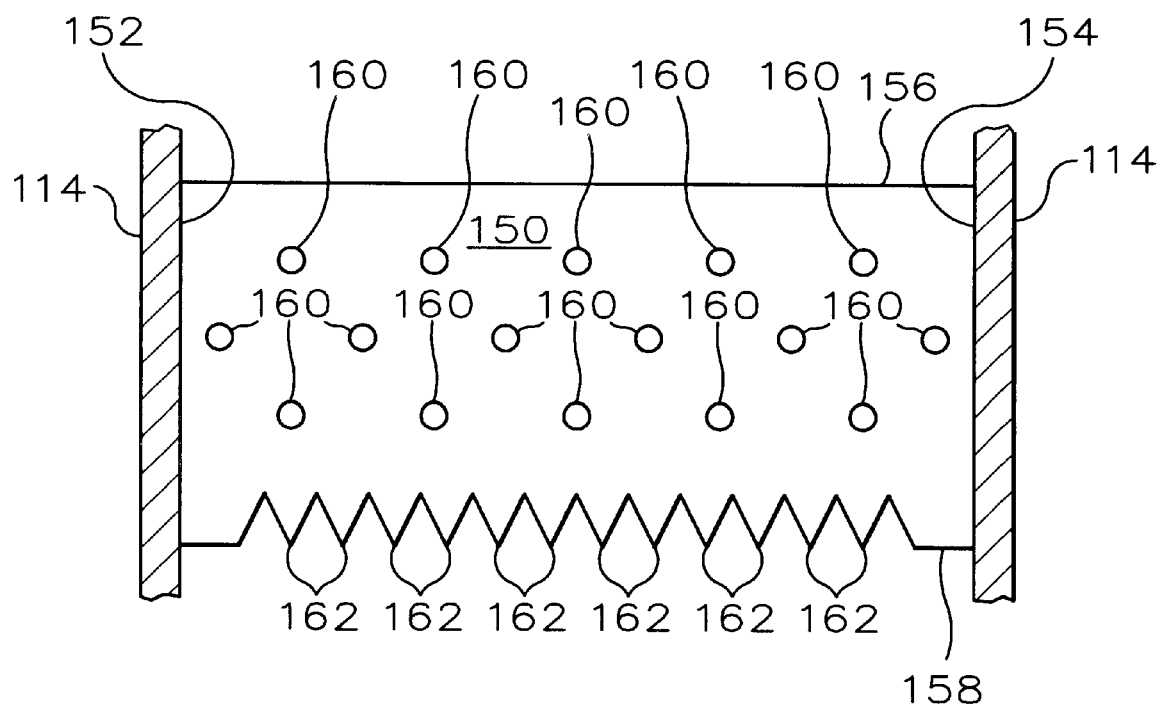
FIG. 6 is a sectional elevation view taken across line 6—6 of the fluid to fluid contactor of FIG. 4 showing the generally rectangular skirt plate.

In FIG. 6, a sectional elevation view providing further detail of skirt plate 150 of baffle 134 is presented. The skirt plate 150 has a first vertical edge 152, a second vertical edge 154, a top edge 156 and a bottom edge 158. The length of the skirt plate 150, in the vertical direction, is between about 6 and 72 inches; preferably between about 9 and 27 inches; and most preferably between about 12 and 24 inches.

The skirt plate 150 may further include a plurality of perforations 160 and saw teeth 162 located along the bottom edge 158. The plurality of perforations 160 in the skirt plate 150 are of a diameter in the range of about ½ to 2 inches; preferably in the range of about ¾ to 1½ inches; and most preferably in the range of about ⅞ to 1¼ inches. The saw teeth 162 are located at the bottom edge 158 of the skirt plate 150 with a distance between saw teeth 162 of between about 2 and 10 inches; preferably between about 4 and 8 inches; and most preferably between about 5 and 7 inches. The height of the saw teeth 162 is between about 1 and 10 inches; preferably between about 2 and 6 inches; and most preferably between about 3 and 4 inches. The configuration and dimensions of the plurality of perforations 160 and saw teeth 162 in skirt plate 150 allow for even distribution of the second fluid from the skirt plate 150 into turbulent contact with the downflowing first fluid.

In another embodiment, the first vertical edge 152 and second vertical edge 154 are fixedly secured to generally rectangular segmenting plates 114 such that an airtight seal is formed within the portion of vertically elongated segment 120 enclosed by the baffle 134.

Figure 7:
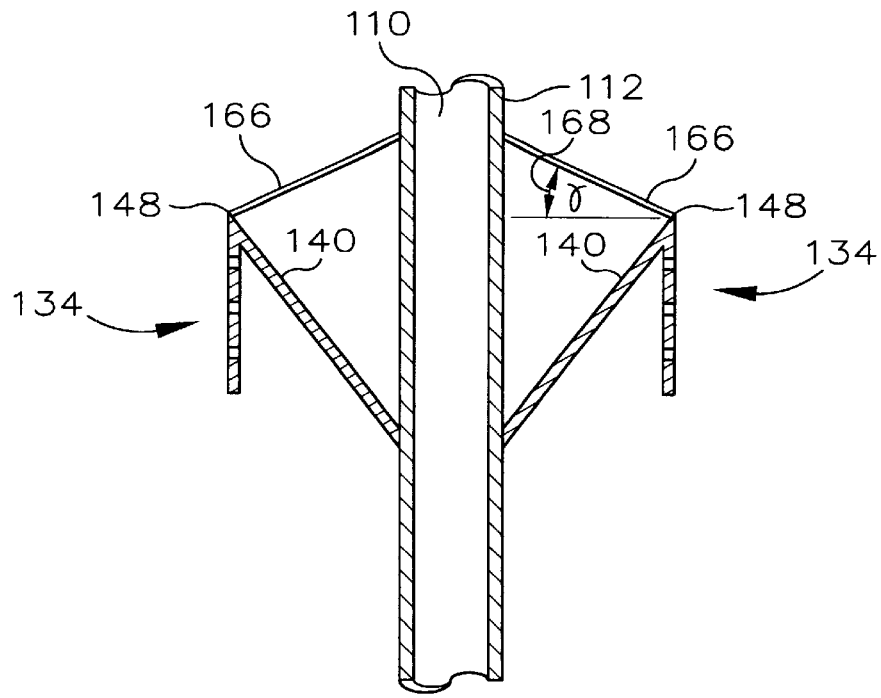
FIG. 7 is a sectional elevation of the fluid to fluid contactor of FIG. 1 showing fluid deflector plates of the baffle of the invention.

FIG. 7 shows a preferred embodiment of baffle 134 which includes a fluid deflector plate 166 fixedly secured to the fourth edge 148 of generally triangular plate 140 and the outer surface 112 of tubular support member 10 to prevent fluid from accumulating on top of the baffles 134. Each of the fluid deflector plates 166 form a seal within vertically elongated segments 120 (vertically elongated segments 120 shown in FIG. 2 and in FIG. 4). The angle 168 (also shown as γ), from a horizontal plane, of the fluid deflector plates 166 on top of the baffles 134 is between about 0 and 60 degrees; preferably between about 10 and 30 degrees; and most preferably between about 15 and 25 degrees. The fluid deflector plates 166 can comprise any suitable erosion resistant material including, but not limited to, refractory, ceramic or a metal plate.

Figure 8:
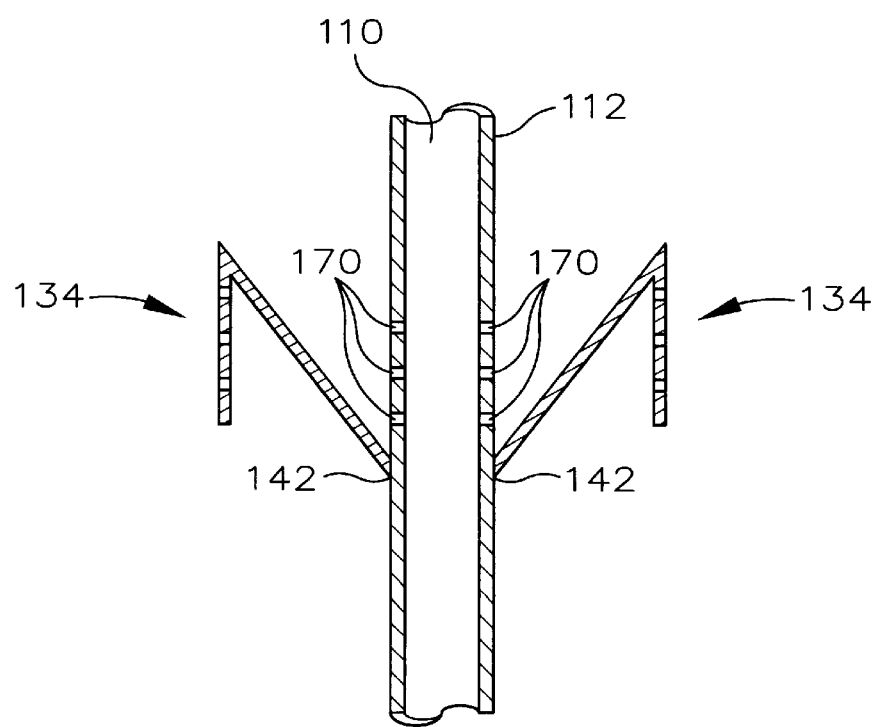
FIG. 8 is a sectional elevation of the fluid to fluid contactor of FIG. 1 showing weep holes in the tubular support member of the invention.

FIG. 8 shows a preferred embodiment, when there is no fluid deflector plate 166, of tubular support member 110 wherein tubular support member 110 defines a hollow center and includes weep holes 170 located just above each first edge 142. The hollow tubular support member 110 and weep holes 170 allow for the removal of fluid accumulating on the baffles 134.

Referring again to FIG. 1 and the operation of the fluid to fluid contactor, a first fluid enters generally cylindrical vessel 100 through first introduction means 122. The flow of the first fluid is evenly distributed in vertically elongated segments 120 (as shown in FIG. 2 and in FIG. 4) of generally cylindrical vessel 100 and exits the generally cylindrical vessel 100 via first withdrawing means 130. A second fluid of lower density than the first fluid enters generally cylindrical vessel 100 through second introduction means 126 and the flow of the second fluid is evenly distributed under the first of the baffles 134 in each vertically elongated segment 120 (as shown in FIG. 2 and in FIG. 4) of generally cylindrical vessel 100 by fluid distributor 128.

The second fluid flows from under the first baffle 134 through the plurality of perforations 160 and under the saw teeth 162 of the skirt plate 150 (as shown in FIG. 6) and forms a turbulent mixing region with the first fluid. The second fluid is then driven, by the flowing force of the first fluid, under the next baffle 134 and then redistributed again through perforations 160 and under saw teeth 162 of the skirt plate 150 for contact with the first fluid. This process is repeated until the second fluid exits the generally cylindrical vessel 100 through second withdrawing means 132. The turbulent region created by the accumulation and redistribution of the second fluid into the flow path of the first fluid results in improved mixing and contacting of the fluids.

This invention is useful in increasing fluid to fluid contacting and mixing where the second fluid is liquid and the first fluid is a fluidized solid or a liquid of higher density, such as in a liquid-liquid extractor or reactor. This invention is most useful in processes where the second fluid is gaseous and the first fluid is a solid or liquid, such as in a gas-liquid stripper, gas-solid stripper, gas-liquid absorber, or any other process where a gas is contacted with a fluidized solid or liquid fluid.

Figure 9:
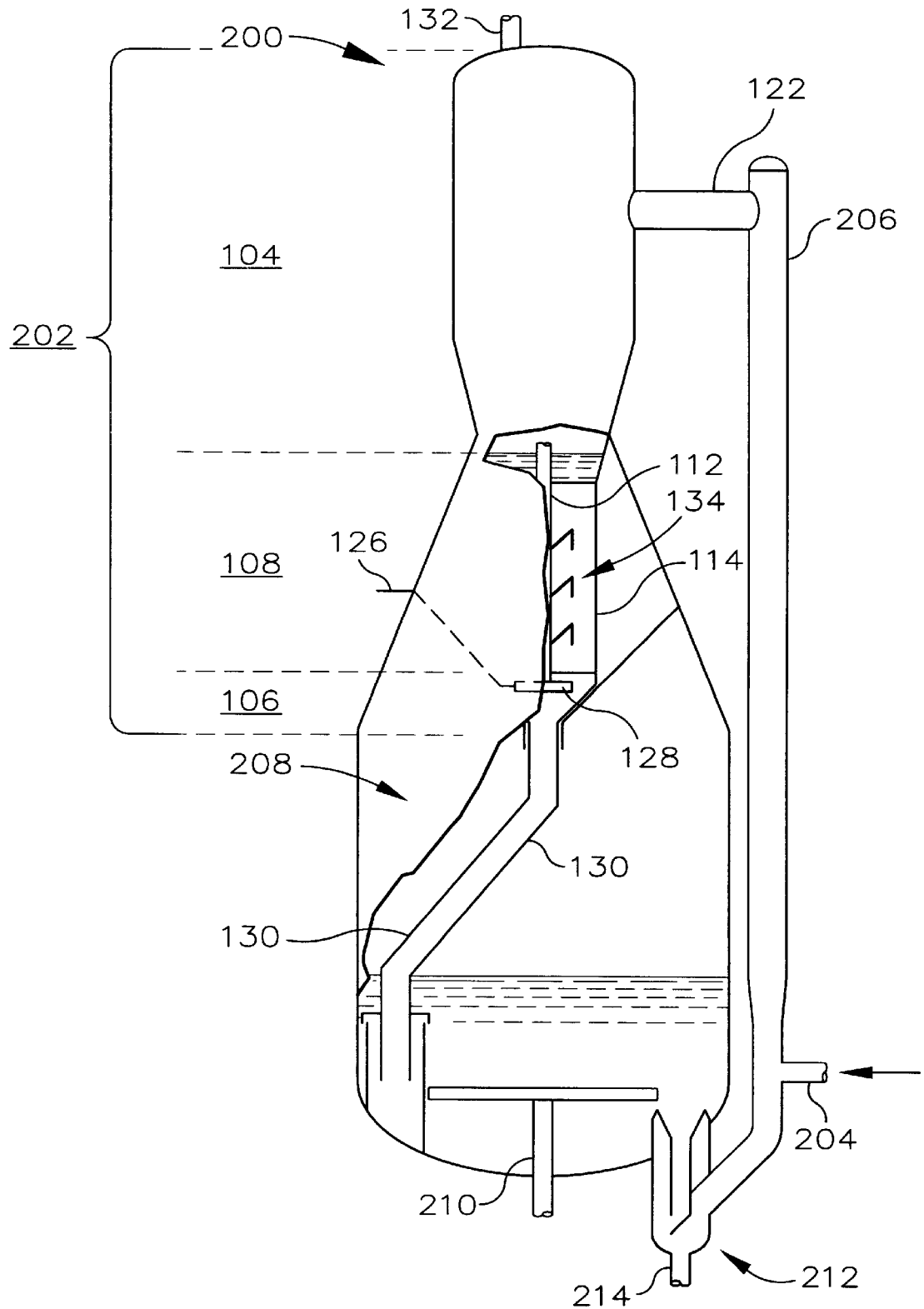
FIG. 9 is a sectional elevation of a segmented fluidized bed catalytic cracking unit (FCCU) including the fluid to fluid contactor as the stripping section.

FIG. 9 shows a FCCU system 200 having incorporated therein the fluid to fluid contactor 10 of FIG. 1 in its preferred use as a segmented stripping section 202. FCCU operations are well known in the art for the conversion of heavy refining streams, such as atmospheric residue and vacuum gas oil, into lower molecular weight hydrocarbons, such as gasoline and lighter products, which have an increased market value over the heavier refining streams.

The FCCU system 200 includes an oil inlet conduit 204 connected in fluid flow communication to the lower end of a riser reactor 206. The riser reactor 206 is connected, in fluid flow communication, with the first introduction means 122 of segmented stripping section 202. First withdrawing means 130 of segmented stripping section 202 is in fluid flow communication with a regenerator section 208. The regenerator section 208 includes an air inlet conduit 210. The regenerator section 208 is in fluid flow communication with a fluidizer section 212 which includes a fluidizing gas inlet conduit 214. The fluidizer section 212 is in fluid flow communication with the lower end of the riser reactor 206.

Heavy oil feed is introduced to riser reactor 206 through conduit 204 wherein heat from the fluidized regenerated catalyst vaporizes the heavy oil feed. The mixing of the heavy oil feed with the fluidized regenerated catalyst catalyzes the conversion of the heavy oil to gasoline range and lighter hydrocarbons as the mixture passes up the riser reactor 206. As the heavy oil is cracked the catalyst is progressively deactivated by the accumulation of hydrocarbons on the surface and in the interstitial spaces of the catalyst.

This partially deactivated catalyst is thereafter referred to as spent catalyst and exits riser reactor 206 through first introduction means 122. The spent catalyst, having an accumulation of hydrocarbons, and hydrocarbon product gases enter upper portion 104 through first introduction means 122 wherein the hydrocarbon product gases and spent catalyst separate and the hydrocarbon product gases exit upper portion 104 through second withdrawing means 132 for fractionation into various products with the spent catalyst particles flowing downwardly. The spent catalyst forms a fluidized bed at a level above the intermediate portion 108.

The spent catalyst passes down through intermediate portion 108 and is stripped of its hydrocarbon by counter flowing stripping gas, preferably steam.

The stripping gas is introduced to the lower portion 106 of the segmented stripping section 202 via second introduction means 126 and fluid distributor 128. The stripping gas passes up through intermediate portion 108 to upper portion 104. Spent stripping gas, containing stripped hydrocarbon gases, exits through second withdrawing means 132.

The stripped catalyst, having a lower accumulation of hydrocarbons than the accumulation of hydrocarbons on the spent catalyst, flows through first withdrawing means 130 to regenerator section 208 where the stripped catalyst is reactivated by burning off any remaining coke deposits with air supplied to regenerator section 208 by air inlet conduit 210. The regenerated catalyst then flows to fluidizer section 212 where fluidizing gas, preferably steam, is injected through fluidizing gas inlet conduit 214 to fluidize the regenerated catalyst and drive it up the riser reactor 206 for contact with the heavy oil feed.

In describing in more detail the performance of fluid to fluid contactor 10 when used as segmented stripping section 202, reference is made to FIG. 1. The spent catalyst is evenly distributed to each of the vertically elongated segments 120 (as shown in FIG. 2 and in FIG. 4) at the top of intermediate portion 108 and flows downwardly through intermediate portion 108. Stripping gas is evenly distributed to each of the vertically elongated segments 120 (as shown in FIG. 2 and in FIG. 4) by fluid distributor 128 at the bottom of intermediate section 108. The stripping gas is introduced underneath the first of the baffles 134 disposed within each vertically elongated segment 120.

The stripping gas exits from under the first baffle 134 horizontally through the plurality of perforations 160 and under the saw teeth 162 (as shown in FIG. 6) of the skirt plate 150 and contacts the downflowing spent catalyst creating a turbulent mixing region wherein hydrocarbons are stripped from the spent catalyst. The stripping gas is then forced under the next baffle 134 by the force of the downflowing spent catalyst where it again accumulates and exits through the plurality of perforations 160 and under the saw teeth 162 of the skirt plate 150 to again turbulently mix with the downflowing spent catalyst wherein hydrocarbons are stripped from the spent catalyst. The stripped catalyst exits intermediate portion 108 into lower portion 106. This process continues until spent stripping gas, containing stripped hydrocarbon gases, exits intermediate portion 108 into upper portion 104.

For the apparatus of the preferred embodiment, the length of the plurality of generally rectangular segmenting plates 114 is established by spent catalyst residence time. The residence time must be of a sufficient length to allow the optimum amount of hydrocarbon stripping from the spent catalyst and the continued reaction of gasoline range hydrocarbons to lighter range hydrocarbons, containing from 1 to 3 carbon atoms, and $H_2$, which can be readily stripped from the spent catalyst before entering the regenerator. The residence time of the spent catalyst is equal to the length (feet) of the plurality of generally rectangular segmenting plates 114 divided by the superficial spent catalyst velocity (feet/minute).

The superficial spent catalyst velocity is defined as the spent catalyst circulation rate (tons/minute) divided by the product of the cross sectional area (feet$^2$) of the generally cylindrical vessel 100 and the spent catalyst density (tons/feet$^3$). The length of the plurality of generally rectangular segmenting plates 114 must be such that the residence time, as defined above, is between about 0.6 and 1.5 minutes; preferably between about 0.8 and 1.3 minutes; and most preferably between about 0.9 and 1.1 minutes.

The use of the upwardly slanted baffles 134 for stripping greatly increases the contacting efficiency of the stripping section by forcing turbulent mixing of the spent catalyst and stripping gas. Also, the vertically elongated segments 120 in the stripping section help to ensure better stripping gas and spent catalyst contacting by ensuring that a set amount of stripping gas will contact a set amount of spent catalyst.

Figure 10:
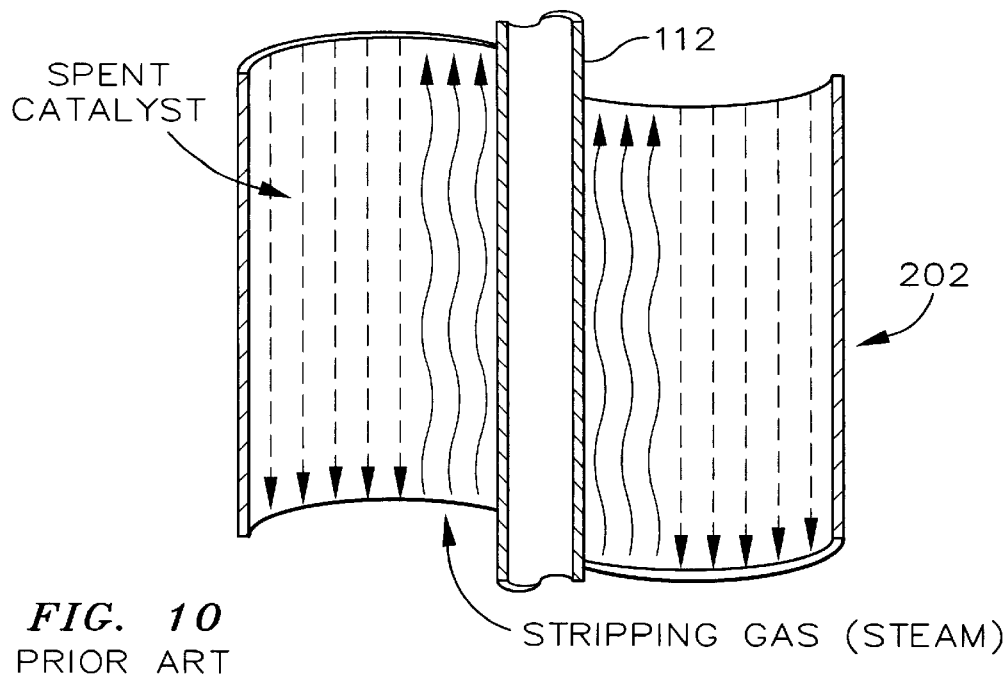
FIG. 10 is a sectional elevation of segmented FCCU stripping section of FIG. 9 without the baffles of this invention (representing the prior art) and shows the flow paths of the spent catalyst and stripping gas when the FCCU stripping section is in use.

Referring now to FIG. 10, therein is depicted a cross section of a typical vertically elongated segment 120 of the segmented stripping section 202 of FIG. 9 without baffles 134, showing the spent catalyst and stripping gas flowpaths as observed during cold flow modeling. It was found that the stripping gas tended to flow along the outer surface of the tubular support member within the vertically elongated segment with the spent catalyst flowing down the inside wall of the stripping section. This channeling problem results in less efficient stripping of coke from the spent catalyst.

Figure 11:
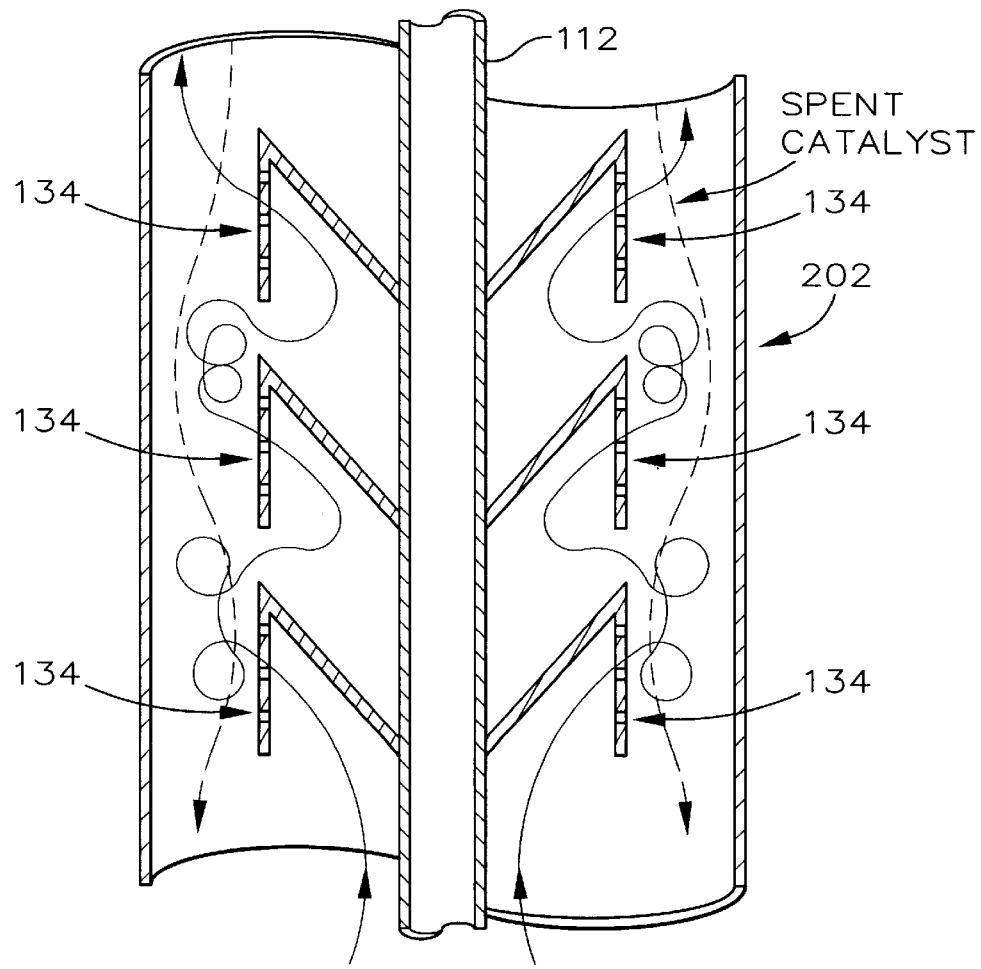
FIG. 11 is a sectional elevation of the segmented FCCU stripping section of FIG. 9 including the baffles of this invention and shows the flow paths of the spent catalyst and stripping gas when the FCCU stripping section is in use.

FIG. 11 depicts a cross section of a typical vertically elongated segment 120 of the segmented stripping section 202 of FIG. 9 with baffles 134, showing the flowpaths of spent catalyst and stripping gas as observed during cold flow modeling. It was unexpectedly found that the stripping gas exiting the baffles is forced into the downwardly flowing spent catalyst to form a turbulent mixing region. The stripping gas then flows under the next baffle to again be forced out into the spent catalyst to form another turbulent mixing region. These turbulent mixing regions result in greater contacting of spent catalyst with stripping gas which results in increased stripping of hydrocarbon from the spent catalyst.

Whereas this invention has been described in terms of the preferred embodiments, reasonable variations and modifications are possible by those skilled in the art. Such modifications are within the scope of the described invention and appended claims.

That which is claimed is:

1. A fluid to fluid contactor comprising:
   a generally cylindrical vessel having an inside wall defining a contacting zone, said contacting zone including an upper portion, a lower portion, and an intermediate portion disposed between said lower portion and said upper portion;
   a tubular support member having an outer surface, said tubular support member being vertically disposed along the axis of said generally cylindrical vessel;
   a plurality of generally rectangular segmenting plates vertically disposed within said intermediate portion and fixedly secured between said outer surface of said tubular support member and said inside wall, wherein said plurality of generally rectangular segmenting plates, said outer surface, and said inside wall define a plurality of vertically elongated segments within said intermediate portion of said generally cylindrical vessel;
   a first introduction means connecting to a first fluid source for introducing a first fluid to be contacted with a second fluid into said upper portion of said generally cylindrical vessel;
   a second introduction means connecting to a second fluid source for introducing said second fluid of lower density than said first fluid into said lower portion of said generally cylindrical vessel;

a first withdrawing means for withdrawing said first fluid, after contact with said second fluid, from said lower portion of said generally cylindrical vessel;

a second withdrawing means for withdrawing said second fluid, after contact with said first fluid, from said upper portion of said generally cylindrical vessel;

at least one baffle disposed within each of said plurality of vertically elongated segments, each of said baffles comprising:
(i) a generally triangular plate having a first edge arced to match the radius of said tubular support member and having a second edge, a third edge and a fourth edge, and wherein said first edge of said generally triangular plate is fixedly secured to said outer surface, and wherein said generally triangular plate extends upwardly and outwardly from said outer surface at an angle from a horizontal plane in the range of from about 10 degrees to about 60 degrees and terminating at said fourth edge positioned between said outer surface and said inside wall; and
(ii) a generally rectangular skirt plate having a first vertical edge, a second vertical edge, a top edge and a bottom edge, and wherein said generally rectangular skirt plate is fixedly secured to said fourth edge of said generally triangular plate and extends downwardly from said fourth edge of said generally triangular plate.

2. The fluid to fluid contactor of claim 1 wherein said second edge of said generally triangular plate is fixedly secured to a first segmenting plate of said plurality of generally rectangular segmenting plates and said third edge of said generally triangular plate is fixedly secured to a second segmenting plate of said plurality of generally rectangular segmenting plates, wherein said second segmenting plate is adjacent to said first segmenting plate.

3. The fluid to fluid contactor of claim 2 wherein said first vertical edge of said vertically disposed skirt plate is fixedly secured to said first segmenting plate and said second vertical edge of said vertically disposed skirt plate is fixedly secured to said second segmenting plate.

4. The fluid to fluid contactor of claim 3 wherein said baffles form a seal within said vertically elongated segments.

5. The fluid to fluid contactor of claim 4 wherein said skirt plate further defines a plurality of perforations.

6. The fluid to fluid contactor of claim 5 wherein said bottom edge of said skirt plate further comprises a plurality of saw teeth.

7. The fluid to fluid contactor of claim 6 further characterized to include between 2 and 12 of said plurality of generally rectangular segmenting plates.

8. The fluid to fluid contactor of claim 7, wherein the ratio of the distance between said fourth edge of said generally triangular plate and said outer surface to the distance between said inside wall and said outer surface is between about 0.25 and about 0.75.

9. The fluid to fluid contactor of claim 8 further characterized to include at least two baffles within each of said a plurality of vertically elongated segments, wherein a second baffle is disposed adjacently below a first baffle, and wherein the vertical spacing of said first and second baffles is such that the angle, from a horizontal plane, of a line connecting said fourth edge of said generally triangular plate of said second baffle and said first edge of said generally triangular plate of said first baffle is between about 75 and about 85 degrees.

10. The fluid to fluid contactor of claim 9 wherein each of said baffles further comprises a fluid deflector plate fixedly secured to said fourth edge of said generally triangular plate and said outer surface of said tubular support member at an angle from a horizontal plane between about 0 degrees and about 60 degrees.

11. The fluid to fluid contactor of claim 10, wherein said fluid deflector plates form a seal within said vertically elongated segments.

12. The fluid to fluid contactor of claim 11, wherein said tubular support member further comprised a hollow center which defines a path for conveying fluid to said first withdrawing means, and wherein said tubular support member further includes weep holes located immediately above said first edge of said generally triangular plate of each of said baffles for removal of said first fluid accumulating on said baffles.

13. The fluid to fluid contactor of claim 1, wherein said generally triangular plate comprises a truncated triangle having four sides, wherein said first edge of said generally triangular plate is formed by replacing an apex of a triangle with a curved section.

14. The fluid to fluid contactor of claim 1, wherein said fourth edge of said generally triangular plate is arced to match a radius intermediate the radius of said tubular support member and the radius of said generally cylindrical vessel.

15. The fluid to fluid contactor of claim 1, wherein said first fluid comprises finely divided fluidized catalyst material containing hydrocarbon deposits, and said second fluid comprises steam.

16. The fluid to fluid contactor of claim 1, wherein said generally cylindrical vessel comprises a stripping vessel associated with a fluidized catalytic cracking unit in petroleum refining.

17. A method of stripping a spent catalyst having a concentration of hydrocarbon associated with a fluidized bed catalytic cracker comprising:

providing the fluid to fluid contactor of claim 1;

introducing said spent catalyst into said upper portion of said generally cylindrical vessel through said first introduction means;

introducing a stripping gas into said lower portion of said generally cylindrical vessel through said second introduction means;

withdrawing a stripped catalyst having a lower concentration of hydrocarbon than the concentration of hydrocarbon on said spent catalyst from said lower portion of said generally cylindrical vessel through said first withdrawing means;

withdrawing said stripping gas containing hydrocarbons stripped from said spent catalyst from said upper portion of said generally cylindrical vessel through said second withdrawing means.

18. The method of stripping spent catalyst of claim 17 wherein said top edge of said skirt plate is fixedly secured to said fourth edge of said generally triangular plate.

19. The method of stripping spent catalyst of claim 18, wherein said second edge of said generally triangular plate is fixedly secured to a first segmenting plate of said plurality of generally rectangular segmenting plates and said third edge of said generally triangular plate is fixedly secured to a second segmenting plate of said plurality of generally rectangular segmenting plates, wherein said second segmenting plate is adjacent to said first segmenting plate.

20. The method of stripping spent catalyst of claim 19 wherein said first vertical edge of said skirt plate is fixedly secured to said first segmenting plate and said second vertical edge of said skirt plate is fixedly secured to said second segmenting plate.

21. The method of stripping spent catalyst of claim 20 wherein said baffles form a seal within said vertically elongated segments.

22. The method of stripping spent catalyst of claim 21, wherein said skirt plate further defines a plurality of perforations.

23. The method of stripping spent catalyst of claim 22 wherein said bottom edge of said skirt plate further comprises a plurality of saw teeth.

24. The method of stripping spent catalyst of claim 23 wherein said fluid to fluid contactor is further characterized to include between 2 and 12 of said vertically elongated segments.

25. The method of stripping spent catalyst of claim 24 wherein the ratio of the distance between said fourth edge of said generally triangular plate and said outer surface to the distance between said inside wall and said outer surface is between about 0.25 and about 0.75.

26. The method of stripping spent catalyst of claim 25, wherein said fluid to fluid contactor is further characterized to include at least two baffles within each of said vertically elongated segments, wherein a second baffle is disposed adjacently below a first baffle, and wherein the vertical spacing of said first and second baffles is such that the angle, from a horizontal plane, of a line connecting said fourth edge of said generally triangular plate of said second baffle and said first edge of said generally triangular plate of said first baffle is between about 75 and about 85 degrees.

27. The method of stripping spent catalyst of claim 26, wherein each of said baffles further comprises a fluid deflector plate fixedly secured to said fourth edge of said generally triangular plate and said outer surface of said tubular support member at an angle from a horizontal plane between about 0 degrees and about 60 degrees.

28. The method of stripping spent catalyst of claim 27 wherein said fluid deflector plates form a seal within said vertically elongated segments.

29. The method of stripping spent catalyst of claim 26 wherein said tubular support member further comprises a hollow center which defines a path for conveying fluid to said first withdrawing means, and wherein said tubular support member further includes weep holes located immediately above said first edge of said generally triangular plate of each of said baffles for removal of said first fluid accumulating on said baffles.

30. The method of stripping spent catalyst of claim 17 wherein said stripping gas comprises steam.

31. The method of stripping spent catalyst of claim 17, wherein the residence time of said spent catalyst within said intermediate portion is between about 0.6 and 1.5 minutes.

* * * * *